US009192176B2

(12) United States Patent
Burmester (10) Patent No.: US 9,192,176 B2
(45) Date of Patent: Nov. 24, 2015

(54) PROCESS FOR PRODUCING FROZEN CONFECTIONERY PRODUCTS (75) Inventor: Sabina Silvia Hanel Burmester, Cambridge (GB)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 14/343,934

(22) PCT Filed: Sep. 10, 2012

(86) PCT No.: PCT/EP2012/067670
§ 371 (c)(1),
(2), (4) Date: Mar. 10, 2014

(87) PCT Pub. No.: WO2013/037741
PCT Pub. Date: Mar. 21, 2013

(65) Prior Publication Data
US 2014/0220204 A1 Aug. 7, 2014

(30) Foreign Application Priority Data
Sep. 15, 2011 (EP) .................................... 11181410

(51) Int. Cl.
A23G 9/00 (2006.01)
A23L 1/00 (2006.01)
A23G 9/26 (2006.01)
(Continued)

(52) U.S. Cl.
CPC .. *A23G 9/26* (2013.01); *A23G 9/24* (2013.01); *A23G 9/282* (2013.01); *A23G 9/285* (2013.01); *A23G 9/48* (2013.01); *A23G 9/503* (2013.01)

(58) Field of Classification Search
CPC ........... A23G 9/24; A23G 9/26; A23G 9/282; A23G 9/285; A23G 9/48; A23G 9/503; A01B 12/006
USPC .................. 426/101, 565, 515, 524; 425/130; 99/485
See application file for complete search history.

(56) References Cited

U.S. PATENT DOCUMENTS 3,262,470 A 7/1966 Alcaro
4,251,201 A 2/1981 Krysiak
(Continued)

FOREIGN PATENT DOCUMENTS

AU 726780 B2 11/2000
CN 101053363 10/2007
(Continued)

OTHER PUBLICATIONS

Clarke, The Science of Ice Cream, Royal Society of Chemistry. 2004, 81-82.
(Continued)

*Primary Examiner* — Steven Leff
(74) *Attorney, Agent, or Firm* — Greenberg Traurig, LLP (57) ABSTRACT A process for producing a frozen confectionery product is provided, the process comprising: supplying a frozen confection to a nozzle which has an orifice having a non-circular cross-section; dispensing a filling comprising sauce and/or inclusions into the frozen confection inside the nozzle; extruding the frozen confection and filling from the nozzle through the orifice until the extruded frozen confection makes contact with a receiving surface; wherein the longest axis of the product is parallel to the direction of extrusion; and then cutting the extruded frozen confection with an iris cutter.

15 Claims, 7 Drawing Sheets (51) Int. Cl.
*A23G 9/24* (2006.01)
*A23G 9/28* (2006.01)
*A23G 9/48* (2006.01)
*A23G 9/50* (2006.01)

(56) References Cited

U.S. PATENT DOCUMENTS

| | | | |
|---|---|---|---|
| 4,579,744 | A | 4/1986 | Thulin et al. |
| 4,648,821 | A | 3/1987 | Thulin |
| 4,734,024 | A | 3/1988 | Tashiro |
| 4,751,878 | A | 6/1988 | Lopes |
| 4,878,425 | A | 11/1989 | Butcher et al. |
| 5,031,567 | A | 7/1991 | Daouse et al. |
| 5,209,156 | A | 5/1993 | Lombard |
| 5,212,960 | A | 5/1993 | Waldstrom |
| 5,958,493 | A | 9/1999 | Grigoli |
| 6,881,050 | B1 | 4/2005 | McIsaac et al. |
| 6,955,829 | B2 * | 10/2005 | Binley et al. ............ 426/101 |
| 2002/0017204 | A1 | 2/2002 | Tashiro et al. |
| 2002/0122848 | A1 | 9/2002 | Marchon et al. |
| 2003/0190391 | A1 | 10/2003 | Kobayashi et al. |
| 2004/0099145 | A1 | 5/2004 | Evans et al. |
| 2004/0258820 | A1 | 12/2004 | Thomas et al. |
| 2005/0072318 | A1 | 4/2005 | Ou-Young |
| 2005/0233033 | A1 | 10/2005 | Marchon et al. |
| 2006/0101956 | A1 | 5/2006 | Hermansen et al. |
| 2008/0038420 | A1 * | 2/2008 | Dyks et al. ............ 426/306 |
| 2008/0268120 | A1 | 10/2008 | Flambeau et al. |
| 2009/0011098 | A1 | 1/2009 | Doehren |
| 2010/0143560 | A1 * | 6/2010 | Burmester et al. ............ 426/516 |

FOREIGN PATENT DOCUMENTS

| | | |
|---|---|---|
| DE | 19909886 A1 | 9/2000 |
| DE | 102008060462 | 6/2010 |
| EP | 0601194 A1 | 6/1994 |
| GB | 656221 | 8/1951 |
| GB | 658793 | 10/1951 |
| GB | 2172541 A | 9/1996 |
| WO | WO9727760 A1 | 8/1997 |
| WO | WO0078159 | 12/2000 |
| WO | WO0243505 | 6/2002 |
| WO | WO2010043493 A1 | 4/2010 |
| WO | WO2011086058 | 7/2011 |

OTHER PUBLICATIONS

Marshall, The Freezing Process, Ice Cream 2003 Chapter 7, p. 190.
PCT International Search Report and Written Opinion on Application No. PCT/EP2012/067670 dated Nov. 14, 2012.
International Preliminary Report on Patentability on Application No. PCT/EP2012/067670 dated Dec. 20, 2013.
Written Opinion of the International Preliminary Examining Authority dated Aug. 30, 2013.

* cited by examiner

PROCESS FOR PRODUCING FROZEN CONFECTIONERY PRODUCTS

TECHNICAL FIELD OF THE INVENTION

The present invention relates to a process for producing frozen confectionery products comprising a frozen confection, such as ice cream, which contains a filling such as sauce and/or inclusions.

BACKGROUND TO THE INVENTION

Stick products are one example of an individual frozen confectionery product that has been known for many years. They are usually produced by an "extrude and cut" process, as follows. Ice cream from the freezer is extruded vertically downwards though a nozzle onto a conveyor. Sticks are inserted as the ice cream comes out of the nozzle and a heated wire cuts it horizontally into uniform portions of the required thickness. Consumers have come to expect that ice cream stick products generally have a certain shape, typically 70-100 mm long×30-60 mm wide×15-35 mm thick with rounded corners and/or edges. This shape is produced by extruding ice cream through an orifice which has the required cross-sectional shape (the cross-section contains the two longest axes of the product).

There is a continual need to provide new and improved products in order to maintain consumers' interest. Whereas in the past products often simply consisted of ice cream with a coating such as chocolate, there is now a demand for more exciting and indulgent products, for example products wherein sauce and/or inclusions are located within the ice cream. Such products can be produced by co-extrusion of ice cream and sauce/inclusions. However, the standard "extrude and cut" process is unsatisfactory when the ice cream contains significant amounts of sauce and/or inclusions. This is because the wire cutter can hit an inclusion during the cutting step. This can cause the inclusion to be dragged by the cutter to the edge of the frozen confection resulting in deformation of the frozen confection and an uneven surface. Moreover, sauce can leak out from the ice cream at the cut surface, and stick to the conveyor or cold plate onto which it lands. Also, the cutter can be damaged by repeated contacts with hard inclusion particles, in particular if they are large in size.

WO 2010/043493 discloses a process which addresses the problem of encapsulating sauce and/or inclusions. The frozen confection is co-extruded with a filling and then cut with an iris cutter. The cross-sectional shape of the extrudate is typically circular, and the resulting product is typically approximately spherical or cylindrical. However, while this process works well for producing products in the shape of balls or rounded bars, we have found that difficulties arise in producing other products, in particular stick products having the expected shape. The iris cutter forms a peak on the cut surface, which should be flat to match the standard stick product shape. Furthermore, having an orifice with a non-circular cross-section can result in the extrudate being twisted by the blades of the iris cutter during cutting. This has the effect that when the cut extrudate lands on a receiving surface beneath the iris cutter (typically a conveyor belt), it does not land on one of its large flat surfaces. This in turn can result in misshapen products and may also cause problems for subsequent handling of the product, for example when a stick is inserted.

Therefore there remains a need for an improved method for producing stick products having the desired shape and containing a fully encapsulated filling of sauces and/or inclusions.

BRIEF DESCRIPTION OF THE INVENTION

We have now developed a process which solves this problem. Accordingly, in a first aspect the present invention provides a process for producing a frozen confectionery product, the process comprising:
 (a) supplying a frozen confection to a nozzle which has an orifice having a non-circular cross-section;
 (b) dispensing a filling comprising sauce and/or inclusions into the frozen confection inside the nozzle;
 (c) extruding the frozen confection and filling from the nozzle through the orifice until the extruded frozen confection makes contact with a receiving surface; wherein the longest axis of the product is parallel to the direction of extrusion; and then
 (d) cutting the extruded frozen confection with an iris cutter.

This process produces products in which the filling is encapsulated within the frozen confection, whilst also allowing the desired shape to be produced without resulting in difficulties in subsequent handling of the product due to misalignment. Allowing the extruded frozen confection to make contact with a receiving surface before cutting it prevents the extrudate from twisting. Although a twisting force is applied by the cutter blades, the contact between the extrudate and the receiving surface resists the twisting, so that the frozen confection is not misaligned on the receiving surface after cutting. Having the longest axis of the product parallel to the direction of extrusion means that the peak which results from the iris cutter is present on one end of the product, rather than on the flat surface, resulting in a shape which conforms to consumers' expectations for stick products.

Preferably the orifice has a generally rectangular cross-section with rounded corners and/or convex sides.

Preferably the frozen confection is at a temperature of below −6° C., more preferably below −10° C., most preferably about −12° C.

Preferably the filling constitutes from 20 to 70 wt % of the product.

Preferably the frozen confection has an overrun of from 20 to 200%.

Preferably the frozen confection is ice cream.

Preferably the product has a volume of from 30 to 500 ml.

Preferably the filling comprises inclusions having a size of from 1 to 20 mm.

Preferably the filling comprises a mixture of sauce and inclusions.

Preferably the filling further comprises a second frozen confection. More preferably the second frozen confection has the same composition as the frozen confection which surrounds the filing.

In one embodiment the filling comprises a sauce which is dispensed into the frozen confection from two outlets located either side of the central axis of the nozzle.

In one embodiment, the product is embossed after step (d).

Preferably after step (d) a stick is inserted in to the product. More preferably the product is embossed while a stick is simultaneously inserted.

In a related aspect, the present invention provides products obtained and obtainable by the process of the first aspect of the invention.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6$^{th}$ Edition, R. T. Marshall, H. D. Goff and R. W. Hartel (2003), Kluwer Academic/Plenum Publishers.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, milk ice and the like. Preferably the frozen confection has a total solids content (i.e. the sum of the weights of all the ingredients other than water, expressed as a percentage of the total weight) of at least 20%, more preferably at least 25%. Frozen confections may be aerated or unaerated. Preferably the frozen confection is aerated, i.e. it has an overrun of more than 20%, preferably more than 30%, more preferably more than 50%. Preferably the frozen confection has an overrun of less than 200%, more preferably less than 150%, most preferably less than 100%. Overrun is defined by the equation below and is measured at atmospheric pressure:

$$\text{overrun \%} = \frac{\text{density of mix} - \text{density of frozen confection}}{\text{density of frozen confection}} \times 100$$

The frozen confection may be manufactured by any suitable process, typically by preparing a mix of ingredients; then pasteurising and optionally homogenising the mix; and then freezing and optionally aerating the mix to produce the frozen confection.

The frozen confection is preferably at a temperature of below −6° C., more preferably below −10° C., most preferably about −12° C. We have found that the lower the temperature of the frozen confection, the better the shape retention of the product after extrusion and cutting, i.e. the product has a better defined and more consistent shape with sharper edges. In particular the frozen confection needs to be sufficiently firm and elastic so that it can encapsulate the filling. Furthermore the frozen confection must not collapse or allow the filling to leak out after it has been cut. The frozen confection can be provided at a suitable temperature by means of a low temperature screw extruder. Low temperature extrusion of frozen confections is described on page 190 of Ice Cream, 6th Edition, and pages 81-82 of "The Science of Ice Cream", C. Clarke (2004) Royal Society of Chemistry, Cambridge. In low temperature extrusion partially frozen ice cream is taken from a standard ice cream freezer (scraped surface heat exchanger) and is passed through a screw extruder (e.g. single or twin screw) in which it is cooled to typically −15° C. The extruder applies a higher shear stress (and lower shear rate) to the ice cream than a conventional freezer, which means that it can operate at low temperatures when the ice cream has very high viscosity.

The filling typically comprises a sauce (i.e. a liquid or liquid-like edible material) and/or one or more inclusions (i.e. solid pieces of edible material). For example, the sauce may have solid inclusions suspended within it. The filling may also comprise a second frozen confection, which may be the same as the frozen confection used to form the outer part/shell of the product, or it may be a frozen confection of a different type/formulation/flavour/colour. For example, the filling which makes up the core of the product may consist of 20% sauce, 20% inclusions and 60% ice cream. Having a frozen confection as part of the filling, especially where the filling constitutes a large part of the whole product, has the advantage that the inclusions and/or sauce can be embedded in the second frozen confection, as opposed to being concentrated in a central core, whilst still avoiding problems in cutting (since the inclusions/sauce are not present in the outer layer). This also allows the inclusions/sauce to be evenly distributed throughout the product, apart from the outer layer which may be quite thin. Moreover the inclusions do not protrude out of the surface of the product despite being present in a large amount.

The sauce may be any sauce typically used in frozen confections. Suitable sauces include fat-based compositions such as chocolate or couverture (i.e. a chocolate analogue containing a fat other than cocoa butter); fruit purees; creams, liquid-like cookie dough or biscuit pastes, honey, syrups, caramel, toffee, nougat or fudge and the like. The filling may be in the form of a fondant or a paste. The filling may be aerated, for example a fruit or chocolate mousse. We have found that for sauces, the higher the viscosity of the filling, the larger the amount of filling which can be encapsulated. Preferably the filling has a viscosity of at least 100 mPas, more preferably at least 500 mPas, most preferably at least 1000 mPas (measured using a TA Instruments, AR 2000 rheometer with a concentric cylinder system at room temperature and a shear rate of $10 \text{ s}^{-1}$).

Inclusions are discrete solid pieces of an edible material, such as chocolate, fruit (which may be e.g. fresh, dried, frozen or sugar-infused), nut, biscuit, cake, cookie, toffee, fudge, nougat, marshmallow, solid pieces of ice cream, water ice and the like. Preferably a number of small inclusions are dispensed into each product. A mixture of different types of inclusions may be used. Typically the inclusions are from 1 to 20 mm in size, preferably 2 to 10 mm, more preferably about 5 to 8 mm. Alternatively In one embodiment, a single large inclusion (e.g. having a diameter of at least 5 mm, more preferably at least 10 mm, most preferably at least 20 mm) is dispensed into each product.

Inclusions are dispensed into the frozen confection inside the nozzle. The inclusions can be dispensed by any suitable device, such as an auger, a pneumatically-driven piston, a differential inclusion feeder, a fruit feeder or simply a hopper which feeds the inclusions by gravity. A piston is preferred when the filling is one or a few large inclusions, since it is possible to synchronise the piston with the cutter, so that the correct number of inclusions is dispensed into the centre of the product. When the filling is a large number of small inclusions, an auger or hopper is suitable. Typically a cavity is formed in the frozen confection immediately downstream of the dispensing device inside the nozzle. The flow rate of the frozen confection is set so that the volume of the cavity matches the volume of the inclusions which are dosed into it, thereby avoiding the presence of air gaps inside the product. A fruit feeder is preferred when the filling itself also comprises a frozen confection. This allows the inclusions to be combined with the frozen confection which makes up part of the filling. Subsequently, the combined filling can be extruded along with the frozen confection which forms the outer layer.

Sauces are dispensed into the frozen confection inside the nozzle. The inclusions can be dispensed by any suitable device. The dispensing device may simply be a second nozzle supplied with the sauce by a pump. Preferably the sauce is dispensed into the frozen confection close to the nozzle orifice. This prevents the sauce from going to the edge of flow (where the shear is highest) before the point at which it is extruded from the nozzle. This could otherwise occur since the sauce is normally significantly less viscous than the frozen confection.

The relative amounts of frozen confection and filling are controlled by adjusting the flow rate of the frozen confection and the flow rate of the sauce and/or the dose rate of the inclusions. Preferably the filling constitutes at least 20%, more preferably at least 30%, even more preferably at least 40%, most preferably at least 50% of the total weight of frozen confection and filling. Preferably the filling constitutes at most 70%, more preferably at most 60% of the total weight of frozen confection and filling. Typically the layer of frozen confection which surrounds the filling is from 2 to 10 mm thick, preferably 4 to 6 mm.

The invention will now be further described by reference to the figures wherein.

Figure 1A:
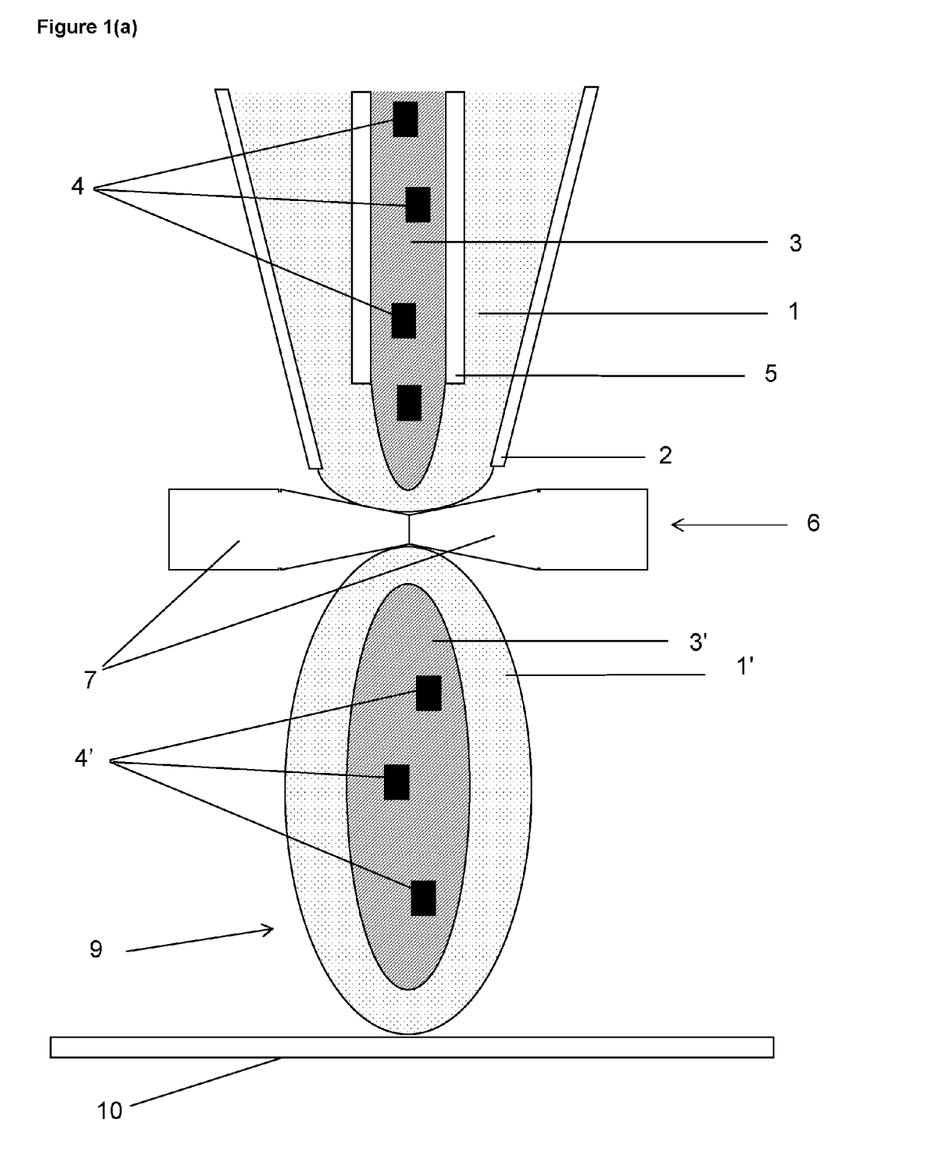
FIG. 1 shows the process of the invention.

As shown in FIG. 1(*a*), the frozen confection 1 is supplied to the nozzle 2. The filling is dispensed into the frozen confection 1 from a second nozzle 5 located inside nozzle 2. The filling consists of a sauce 3 containing inclusions 4. The frozen confection 1 and filling are co-extruded from the nozzle 2. The cross-sectional shape of this extrudate depends on the shape of the orifice of nozzle 2, which may be of any non-circular shape, for example a rectangle with rounded corners and convex long sides, shown in FIG. 2.

In the next stage of the process, the end of the extruded frozen confection makes contact with a receiving surface 10, for example a plate or conveyor belt. Typically the frozen confection will be extruded vertically downwards through the aperture of the iris cutter 6 until the lower end of the stream of extruded frozen confection (the extrudate) makes contact with the receiving surface. Thus the distance between the cutter and the receiving surface should be such that the surface can just support the product before it is cut. (The frozen confection is usually somewhat elastic, so it stretches a small amount under its own weight.) This corresponds to the longest axis of the product. This is in contrast to conventional extrude and cut processes, where the frozen confection is extruded vertically downwards and the long axis of the product is horizontal, i.e. perpendicular to the direction of extrusion. Using an iris cutter can result in a small peak on the cut surface of the product. This is generally insignificant when present on the end of the product (i.e. if the product has been extruded with its long axis in the direction of extrusion), but could be noticeable to the consumer if present on the largest surface of the product (i.e. if the product were extruded with its long axis perpendicular to the direction of extrusion).

Once the extruded frozen confection has made contact with the receiving surface, the extrudate is cut into individual products by means of an iris cutter 6 which operates in a similar manner to a multi-vane iris shutter in a camera. Such iris cutters are described in U.S. Pat. No. 4,251,201 and have been used when encapsulating fillings in various food products, such as dough, as described for example in U.S. Pat. No. 4,734,024. Iris cutters have also been used for forming round items of frozen confectionery in US 2005/0233033. As shown in FIG. 2, iris cutters typically comprise a number of moveable blades 7 which form an aperture 8 of variable size. The aperture can be opened and closed by sliding the blades. At least three blades are normally used to form the aperture (in the cross-sectional view of FIG. 1 only 2 blades are visible). The greater the number of blades, the more closely circular is the aperture, so that preferably at least six blades are used. In profile the blades are typically tapered as shown in FIG. 1.

As the aperture closes the blades apply a force radially inwards. The blades also apply a tangential force because of their sliding movement and an axial force because of their tapered profile. These forces help to separate the stream of filling before the frozen confection is cut, thereby avoiding contact between filling and the blades, and resulting in the product 9 in which the filling (i.e. sauce 3' and inclusions 4') is encapsulated in the frozen confection 1'. However, this tangential force can also cause the extrudate to twist around a vertical axis. In order to prevent this, the extruded frozen confection is allowed to make contact with a receiving surface 10 before cutting. We have found that this prevents the extrudate from twisting. Although a twisting force is applied by the cutter blades, the contact between the extrudate and the receiving surface resists the twisting, so that the frozen confection is not misshapen or misaligned on the receiving surface after cutting. Misalignment could cause problems during subsequent handling of the product (e.g. in relation to stick insertion, picking up the product by the stick for dipping into chocolate etc.).

The cutter preferably moves downwards at the same velocity as the extruded frozen confection during the cutting step in order to prevent the frozen confection from piling up on top of the cutter and therefore becoming misshapen. The frozen confection and filling are preferably extruded continuously, so that multiple products are formed by repeatedly cutting the extruded stream with the iris cutter. Once cutting has been completed, the iris cutter is opened and then moved back up to its original position, ready to cut the next piece of frozen confection. The time between successive cutting steps and the speed of extrusion determine the length of the product.

The iris cutter allows products containing solid inclusions to be cut without inclusions protruding from the surface and also prevents leakage of sauces, thereby avoiding the sauce sticking to the surface on which the product is placed after cutting because the filling is encapsulated within the frozen confection.

Preferably the product has a volume of from 30 ml to 500 ml, preferably from 50 to 200 ml, such as about 100 ml.

Figure 3:
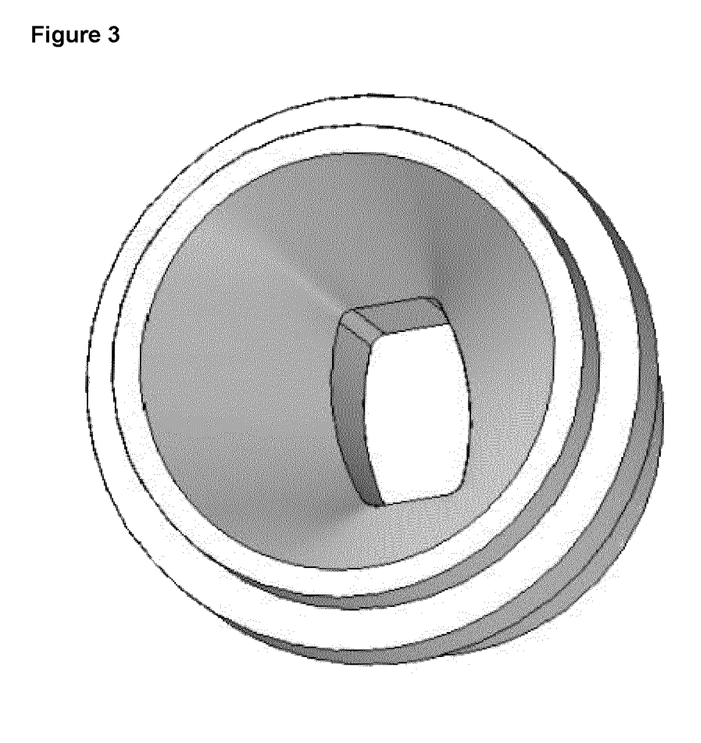
FIG. 3 is a top view of an iris cutter.

Preferably the nozzle orifice has a generally oval shape, i.e. in the form of a closed curve with one axis longer than the other, or a rectangular shape with rounded corners and/or some or all of the sides being convex, in order to produce frozen confection products having the desired shape. Preferably the nozzle is tapered so that the diameter of the orifice is smaller than the diameter of the rest of the nozzle. Such an embodiment is shown in FIG. 3.

Figure 1B:
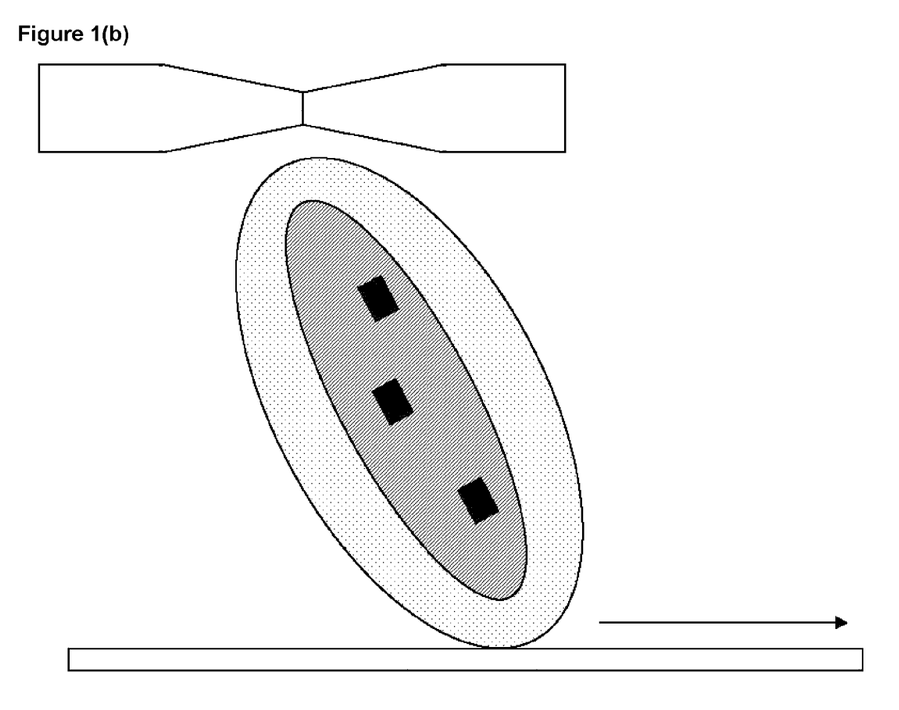
Figure 1C:
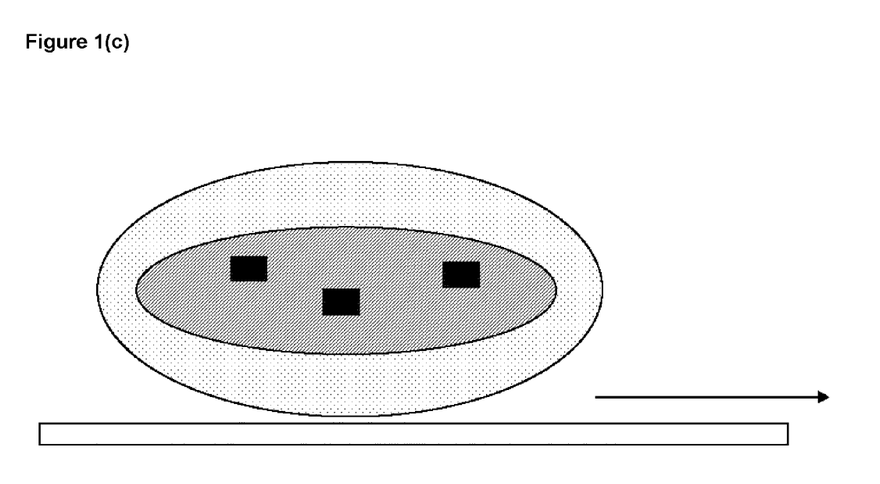
Figure 2:
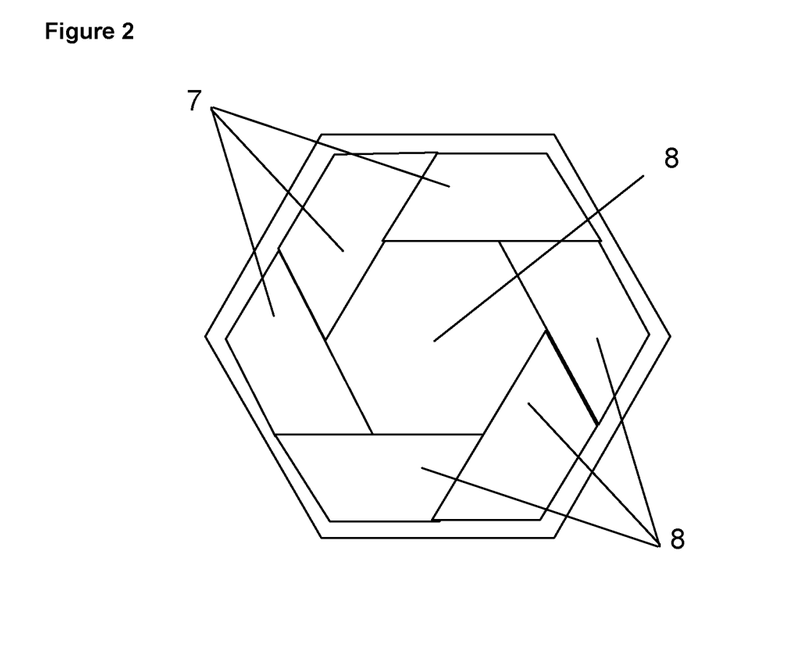
FIG. 2 shows a nozzle having a non-circular orifice.

Preferably, as shown in FIGS. 1(*b*) and 1(*c*), the receiving surface moves horizontally beneath the cutter so that the products rotate from having their longest axis vertical to horizontal as they land on the receiving surface and become aligned with its direction of motion. Preferably the surface moves at the same speed as the speed of extrusion from the nozzle.

Figure 4:
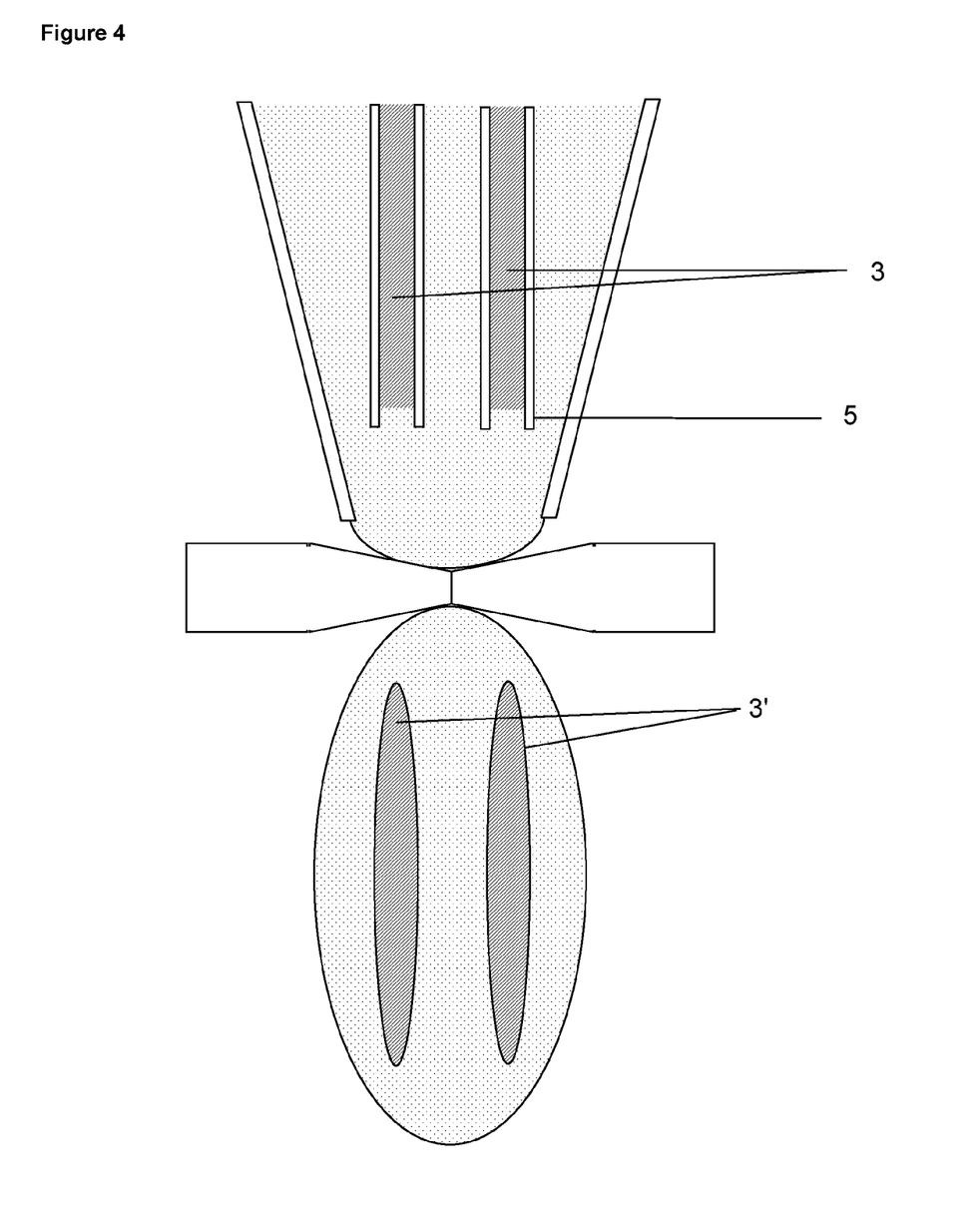
FIG. 4 shows a process wherein the sauce is dispensed from two outlets.

In one embodiment, sauce (which may or may not contain inclusions) is dispensed from two nozzles 5 as shown in FIG. 4 (or alternatively from a single nozzle having two outlets). This produces a product which contains two cores of sauce 3 located either side of its central axis. This has the advantage that when a stick is inserted into the product along the line of the central axis, the stick becomes embedded in frozen confection rather than the sauce. If the stick were inserted into a core of sauce, the product might not be held securely on the stick because of the liquid nature of the sauce. Therefore the stick could easily become displaced. Alternatively, the sauce flow may be pulsed, so the core of sauce is located in the top part of the product, beyond the furthest point to which the stick can penetrate.

In one embodiment the product first lands on a first moving surface and is then transferred onto a second cold surface moving horizontally at 90° to the first one. In this way the products are arranged with their long axis perpendicular to the direction of motion of the second surface, which facilitates the subsequent insertion of a stick. Preferably the second surface is sufficiently cold (e.g. at about −35° C.) so the outer ice cream will freeze and stick to it. This has the advantage that the product is held in place on the surface and does not move when a stick is then inserted. Sticks may be inserted by conventional means, such as a pneumatically-driven stick inserter.

The products may be embossed after cutting by applying a stamp. The stamp is preferably cold (such as below −50° C.), for example it may be placed in liquid nitrogen before stamping. In a preferred embodiment, the products are embossed while a stick is simultaneously inserted. Inserting the stick could result in movement of the product on the surface, especially if the stick hits a solid inclusion. This in turn can lead to subsequent problems, for example misalignment when the product is intended to be picked up by its stick. However, if stick insertion and embossing occur simultaneously, the stamp helps to hold the product in place while the stick is inserted.

The conveyor carries the ice cream through a hardening tunnel where its temperature is reduced to about −35° C. The product may then be coated, e.g. with chocolate, for example by dipping, spraying or enrobing.

The present invention will now be further described with reference to the following examples, which are illustrative only and non-limiting.

EXAMPLE 1

Figure 5:
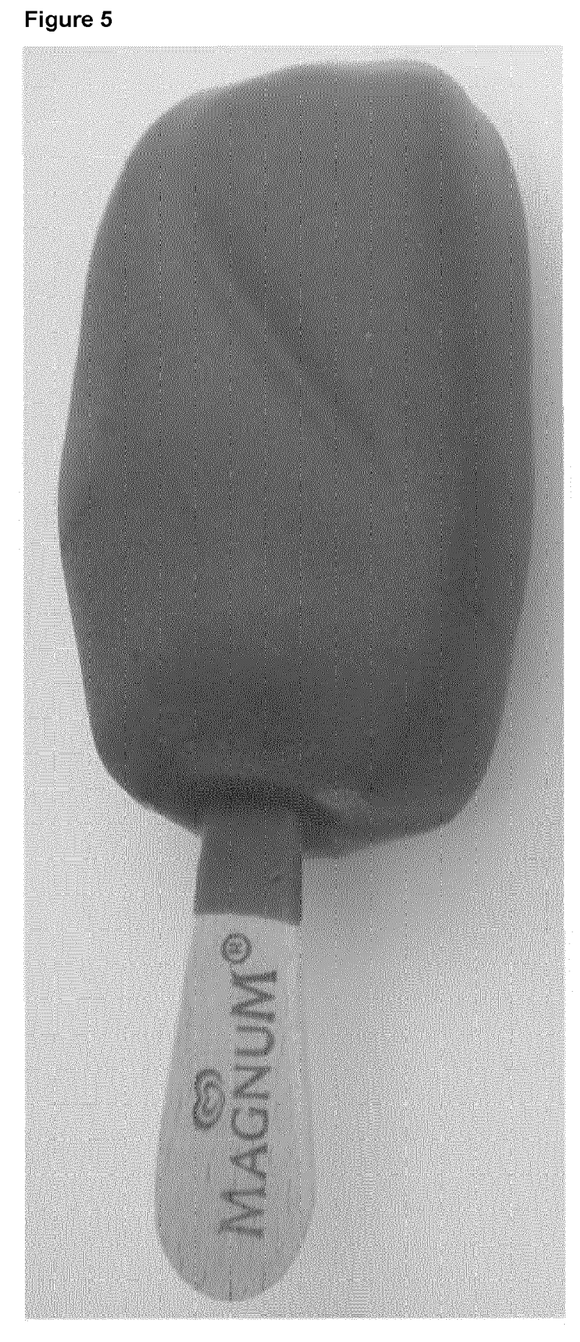
FIG. 5 shows a product produced by the process of the invention.

Frozen confectionery products were produced consisting of a filling (43 wt %) inside a shell of ice cream (57 wt %). The filling consisted of dried cranberries (17 wt % of the filling), chocolate chunks (14 wt %) and sauce (28 wt %). The ice cream was a standard 11% fat formulation which was frozen and aerated to 60% overrun in a conventional ice cream freezer, and then further frozen in a single screw low temperature extruder to a temperature of −12° C. The ice cream for the shell was supplied to a first nozzle. The ice cream for the core was pumped through a fruit feeder where the inclusions were dosed into it. The combined ice cream and inclusions were then dispensed from a second nozzle located inside the first nozzle. A third nozzle having two outlets, located centrally inside the first nozzle, was used to add the sauce. Two streams of sauce were dosed either side of the central axis. The ice cream and filling were co-extruded vertically downwards, through the orifice of the first nozzle. The orifice was approximately rectangular with rounded corners and slightly convex long sides. The iris cutter was closed when the lower end of the extrudate made contact with a conveyor. Thus the length of the product corresponds to the distance between the iris cutter and the conveyor at this point (approximately 9 cm). Although a twisting force was applied by the cutter blades, the contact between the extrudate and the conveyor resisted the twisting. As the iris cutter cut the top of the extrudate, the conveyor moved the bottom of the bar horizontally, so that after cutting, the bar lay with its long axis horizontally on the conveyor. The bar was then transferred to a second conveyor where a stick was inserted. The product was then embossed with an "S" shaped stamp to form an indentation on the large surface of the ice cream. The stamp had been cooled to a low temperature with liquid nitrogen. The resulting products were approximately 75 ml in volume, and the sauce and inclusions were encapsulated within the ice cream. Each product was then hardened and finally coated with chocolate by dipping. The products had the desired shape expected of stick products, as shown in FIG. 5.

EXAMPLE 2

Further frozen confectionery products were produced as described in example 1, but with a filling consisting of 35% chocolate coated almonds and 35% sauce.

The various features and embodiments of the present invention, referred to in individual sections above apply, as appropriate, to other sections, mutatis mutandis. Consequently features specified in one section may be combined with features specified in other sections, as appropriate. Various modifications of the described modes for carrying out the invention which are apparent to those skilled in the relevant fields are intended to be within the scope of the following claims.

The invention claimed is:

1. A process for producing a frozen confectionery product, the process comprising:
   (a) supplying a frozen confection to a nozzle which has an orifice having a non-circular cross-section;
   (b) dispensing a filling comprising sauce and or inclusions into the frozen confection inside the nozzle;
   (c) extruding the frozen confection and filling from the nozzle through the orifice until the extruded frozen confection makes contact with a receiving surface; wherein the longest axis of the product is parallel to the direction of extrusion; and then
   (d) cutting the extruded frozen confection with an iris cutter,
   wherein the receiving surface moves horizontally beneath the cutter so that the products rotate from having their longest axis vertical to horizontal as they land on the receiving surface and become aligned with its direction of motion.

2. A process according to claim 1 wherein the frozen confection is at a temperature of below −6° C.

3. A process according to claim 1 wherein the filling constitutes from 20 to 70 wt % of the product.

4. A process according to claim 1 confection has an overrun of from 20 to 200%.

5. A process according to claim 1 wherein the frozen confection is ice cream.

6. A process according to claim 1 wherein the product has a volume of from 30 to 500 ml.

7. A process according to claim 1 wherein the filling comprises inclusions having a size of from 1 to 20 mm.

8. A process according to claim 1 wherein the filling comprises a sauce in which inclusions are suspended.

9. A process according to claim 1 wherein the filling further comprises a second frozen confection.

10. A process according to claim 9 wherein the second frozen confection has the same composition as the frozen confection which surrounds the filing.

11. A process according to claim 1 wherein the filling comprises a sauce which is dispensed into the frozen confection from two outlets located either side of the central axis of the nozzle.

12. A process according to claim 1 wherein after step (d) the product is embossed.

13. A process according to claim 1 wherein after step (d) a stick is inserted in to the product.

14. A process according to claim 12 wherein embossing and stick insertion take place simultaneously.

15. A process according to claim 1 wherein the nozzle orifice has a generally rectangular cross section with rounded corners and/or convex sides.

\* \* \* \* \*